US006631473B2

(12) United States Patent
Townsend

(10) Patent No.: US 6,631,473 B2
(45) Date of Patent: *Oct. 7, 2003

(54) ADAPTIVE COUNTERMEASURE SELECTION METHOD AND APPARATUS

(75) Inventor: Timothy J. Townsend, Los Altos, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 10/105,250

(22) Filed: Mar. 26, 2002

(65) Prior Publication Data

US 2002/0188861 A1 Dec. 12, 2002

Related U.S. Application Data

(63) Continuation of application No. 09/129,626, filed on Aug. 5, 1998, now Pat. No. 6,374,358.

(51) Int. Cl.[7] .............................................. G06F 13/00
(52) U.S. Cl. ..................................................... 713/201
(58) Field of Search ................................. 713/200, 165, 713/201, 166, 202, 151, 152; 709/229; 380/241, 52, 201, 202

(56) References Cited

U.S. PATENT DOCUMENTS

| 5,533,123 A | * | 7/1996 | Force et al. ............... 380/201 |
| 5,850,516 A | * | 12/1998 | Schneier .................... 713/200 |
| 6,374,358 B1 | * | 4/2002 | Townsend et al. .......... 713/201 |
| 6,542,993 B1 | * | 4/2003 | Erfani ........................ 713/201 |

OTHER PUBLICATIONS

L. Labuschagne, et al., "The Use of Real–Time Risk Analysis to Enable Dynamic Activation of Countermeasures", Computers and Security, vol. 17, No. 4, (1998), pp. 347–357.

* cited by examiner

Primary Examiner—James P. Trammell
Assistant Examiner—Pierre E. Elisca
(74) Attorney, Agent, or Firm—Finnegan, Henderson, Farabow, Garrett & Dunner L.L.P.

(57) ABSTRACT

A method of selecting a security model for an organization operating an application on the organization's computer network is described. A current strength level for a countermeasure is determined based on input data and rules corresponding to the application. The method and apparatus determine a recommended strength level for countermeasures based on the input data and security risk data. Based on the current strength level and the recommended strength level, the method determines and outputs a security model including a countermeasure and corresponding strength level. The method may also modify the model based on exception conditions. The method may be used to calculate the risk of attack to the application and degree to which the organization conforms to industry practices.

15 Claims, 7 Drawing Sheets

POLICY 1.0
1. Is there a security policy for this application system?
(.1) No (.2) Yes 2. Describe the your knowledge level of the Application System security policy?
(a) Informal policy exists.
(b) A policy has been distributed.
(c) I have personal knowledge of the policy and procedures.

4. Is there a process in place for security policy compliance?
(.1) No (.2) Yes

5. Are exceptions to policy allowed, if so how are they submitted?
(.1) No (.2) Yes
Explain the exception: _____

TRAINING 2.0
1. Are you aware of any corporate security training programs?
(.1) No (.2) Yes 2. Which statement best describes the corporate security training program?
(a) None
(b) Training is informal.
(c) Training available, but not required
(d) Training is defined courses are available and required
Please list any security training that you are aware of: _____

5. Have you received any unique Application Systems security training?
(.1) No (.2) Yes 3a. Which statement describes any Application System unique security training that is available
(a) None
(b) Training is informal
(c) Training requirement identified but not formal
(d) Training courses identified and mandatory
If yes please describe._____

4. Are security training compliance measurements and monitoring procedures in place?
(a) Yes
(b) No
(c) Don't Know.
5. Training compliance is monitored by:
(a) 1st level supervisor
(b) Department Manager
(c) Training department.

FIG. 2

TABLE 1: Attack Signatures — Attack Types, $T_j$

Business Concerns $C_i$

| | Disclosure | Modification | Interruption/ Denial of Svc | Deletion/ Destruction |
|---|---|---|---|---|
| Embarassment/ Reputation | 0.6 | 0.8 | 0.4 | 0.4 |
| Extortion | 1 | 0.6 | 0.8 | 0.8 |
| Fraud/ Embezzlement | 0.8 | 1 | 0 | 0.4 |
| Loss of market share/ increased competition | 1 | 0.8 | 0 | 0 |

FIG. 3A

TABLE 2: Vulnerability Profile — Attack Types, $T_j$

Countermeasures $M_i$

| | Disclosure | Modification | Interruption/ Denial of Svc | Deletion/ Destruction |
|---|---|---|---|---|
| Policy Awareness | 0.6 | 0.6 | 0.4 | 0.4 |
| Policy Compliance | 0.8 | 0.8 | 0.4 | 0.6 |
| Corporate Security Awareness | 0.6 | 0.6 | 0.4 | 0.4 |
| Unique Training | 0.6 | 0.6 | 0.4 | 0.4 |
| Account Revocation | | | | |

FIG. 3B

| Reference | Countermeasure M(n) | H(n) Level 1 | Level 2 | Level 3 | Level 4 | Level 5 |
|---|---|---|---|---|---|---|
| 1.1 | Policy Awareness | 1.1.1 401 | 1.1.2 & 1.2.1 | | 1.1.2 & 1.2.2 | 1.1.2 & 1.2.3 |
| 1.2 | Policy Compliance | 1.3.1 | | 1.3.2 & 1.4.2 | | 1.3.2 & 1.4.1 |
| 2.1 | Corporate Security Awareness | 2.1.1 or 2.2.1 | 2.1.2 & 2.2.2 | | 2.1.2 & 2.2.3 402 | 2.1.2 & 2.2.4 |
| 2.2 | Unique Training | 2.3.1 or 2.3a.1 | 2.3.2 & 2.3a.2 | | 2.3.2 & 2.3a.3 | 2.3.2 & 2.3a.4 |
| 2.3 | Training Compliance* | 2.3.1 & (2.4.1 or 2.4.3) | 2.3.2 & 2.4.3 | | 2.3.2 & 2.4.2 | 2.3.2 & 2.4.2 & 2.5.x |
| 3.1 | Authorization End User | (3.1.1 & 3.2.1) or 3.6.3 | (3.1.1 & 3.2.2) & 1 of, 3.3a.2, 3.4a.2, 3.5a.2, (3.7.1 or 3.7.2 or 3.7.3) | (3.1.1 & 3.2.2) & 2 of, 3.3a.2, 3.4a.2, 3.5a.2, (3.7.1 or 3.7.2 or 3.7.3) | (3.1.1 & 3.2.2) & 4 of, 3.3a.2, 3.4a.2, 3.5a.2, (3.7.1 or 3.7.2 or 3.7.3) | (3.1.1 & 3.2.2) & 3.7.4 & 3 of, 3.3a.2, 3.4a.2, 3.5a.2 |

FIG. 4

1) Is the number of users is greater than 150? If so, then implement more rigid account management procedures including:

- Formal procedures with revocation/modification of terminated or inactive accounts.
   - Passwords centrally assigned and monitored, with quarterly password cracking in place.
   - Each user has unique password with 90-day mandatory password changing
   - All new passwords are screened for suitability prior to system acceptance 2) Is the application system transaction value greater than $5 million per quarter OR
   Is the application system a Data Base of Record? If so, implement formal configuration management procedures with quality assurance including:

- Two- person rule for all code-level alterations
   - Quality assurance testing of all code prior to acceptance on production system
   - Compartmentalize data within Intranet using firewall and/or other solutions Etc.

FIG. 5

INFORMATION SECURITY POLICIES

2.0 Training

This policy addresses the requirements for identifying training needs specific to an application system, and the general need for corporate security awareness training. The policy also covers compliance with the delivery of training to the appropriate personnel. The policy applies to all company personnel who manage, administer and use the application system. If the application system is also used by non-employees, it is the responsibility of the system owner to ensure that any needed training requirements are identified for them, and that appropriate non-employees have access to and receive the necessary training to operate the application system properly and securely.

2.1 Requirements For Corporate Security Awareness Training In The Operation Of An Application System.

L1 – *No specific training identified.*

L2 – Use L3.

L3 – *Training requirement identified, but not formal.* The application system owner may determine which personnel, if any, must attend corporate security awareness training classes. Other personnel may be given a security briefing, written corporate security policies, a corporate security awareness video, or the policy summary for the application system.

L4 – Use L5.

L5 – *Training identified and courses available.* The application system owner must indicate which personnel are required to take standard corporate security awareness classes. If the system owner determines that the standard courses are not sufficient for the sensitivity of the application system, arrangements must be made with the corporate training department to produce and offer courses which do meet the need. The training must include procedures for reporting suspected security incidents and for escalating serious security events to appropriate managers.

2.2 Requirements For Unique Security Training For The Successful Operation Of An Application System.

L1 – *No specific training identified.*

L2 – Use L3.

L3 – *Training requirement identified, but not formal.* The application system owner has determined there are security needs specific to the application system which require special training. The application system owner, or a designated representative, is responsible for providing the special training by means of briefings, demonstrations, or written materials.

L4 – Use L5.

L5 – *Training identified and courses available.* The application system owner has determined there are security needs specific to the application system which require special training. The application system owner is responsible for ensuring that the corporate training department has the necessary input and resources to produce the required courses, and that the courses are available to personnel in time to meet production schedules.

FIG. 6

ADAPTIVE COUNTERMEASURE SELECTION METHOD AND APPARATUS

This application is a continuation of application Ser. No. 09/129,626, filed Aug. 5, 1998 now U.S. Pat. No. 6,374,358, which is incorporated herein by reference.

BACKGROUND OF THE INVENTION

A. Field of the Invention

This invention relates generally to information security and, more particularly, to improved methods and apparatus for selecting information security solutions based on a multitude of parameters.

B. Description of the Related Art

The number of entities using the Internet and the World Wide Web for all types of business solutions is growing rapidly. At the same time, the need for increased internal security around corporate information systems is also increasing due, in part, to the increased penetration of information systems. Increasing physical security is often not the only solution especially if the business allows access not just to employees, but to personnel outside the organization such as vendors, contractors, and temporary employees.

One common solution to information security risks is to protect information using firewalls. A firewall is a combination of hardware and software that limits the exposure of a computer or group of computers to attacks from the outside. Firewalls provide a single point of entry to protect network resources from unauthorized access. A firewall may comprise, for example, application proxies, access control lists, logging capabilities, or filtering. Relying solely on firewall perimeter protection is often inadequate. Furthermore, firewalls frequently hinder business plans to communicate electronically between customers, suppliers, and business partners.

Other existing security countermeasures include password protection, encryption, and fireridges. A fireridge is essentially a limited firewall operating on an internal network, such as an intranet, and can contain filters, application proxies, and other means for shielding computers from other computers on the internal network. Each of these security countermeasures used alone may be inefficient in part because they were not designed for use with corporate networks or because security holes exist in the overall systems implementation.

Evaluating an organization's overall system of security measures on an application by application basis is very expensive and often difficult. Interpretation of the results of a security risk assessment is often unreliable and subjective because they are conducted by human auditors who may have varying degrees of expertise in systems security engineering and may unknowingly focus on one area of the system more than another. Additionally, conventional risk assessments are often expressed in terms of estimated loss calculated without using formulas or historical data. Consequently, entities in the business of managing risk exposure, such as corporate management or insurance service groups, have few actual tools to use in estimating loss. Furthermore, conventional risk assessment tools, such as annual loss expectancy, do not assist organizations in selecting a less risky security model.

The security of large corporate networks is particularly challenging to assess for many reasons. The networks may have hundreds of different applications systems and servers, thousands of user accounts, and exchange billions of bytes of information with the Internet every day. The sheer volume of users and transactions make it more difficult to design and monitor a secure architecture. The process of inventorying an organization's application systems, the current level of security measures implemented by the organization, and even the applications architecture can be a daunting task. Moreover, once this information is collected, the information is difficult to keep current with the dynamism of the corporation is a difficult task. Without automation, therefore, the task of risk analysis can be further complex and very time consuming to do well.

Therefore, a need exists for an improved method of assessing the information security of large corporate systems in a manner that is based on best industry practices and principles and is reliable, repeatable, cost efficient, and consistent from system to system. Furthermore, a need exists for a method of selecting a security model based on the assessment.

SUMMARY OF THE INVENTION

In accordance with the invention, systems and methods consistent with the present invention create a security model for an organization operating an application on a computer network to protect the application from attack by unauthorized sources. A current countermeasure strength level and a recommended countermeasure strength level are determined for each of at least one countermeasure based on input data and security risk data. A security model including at least one countermeasure and a corresponding strength level is determined based on the current and the recommended strength levels.

BRIEF DESCRIPTION OF THE DRAWINGS

The accompanying drawings, which are incorporated in and constitute a part of this specification, illustrate an embodiment of the invention and, together with the description, serve to explain the advantages and principles of the invention. In the drawings.

FIG. 2 is an example of a questionnaire consistent with the present invention;

FIGS. 3a and 3b are tables showing parameters consistent with the present invention;

FIG. 4 is an example of a data base of rules consistent with the present invention;

FIG. 5 is an example of rules for handling exception conditions consistent with the present invention;

FIG. 6 shows an example of information security policies consistent with the present invention.

DETAILED DESCRIPTION

Reference will now be made in detail to an implementation consistent with the principles of the present invention as illustrated in the accompanying drawings. Wherever possible, the same reference numbers will be used throughout the drawings and the following description to refer to the same or like parts.

A. Method of Operation

Figure 1:
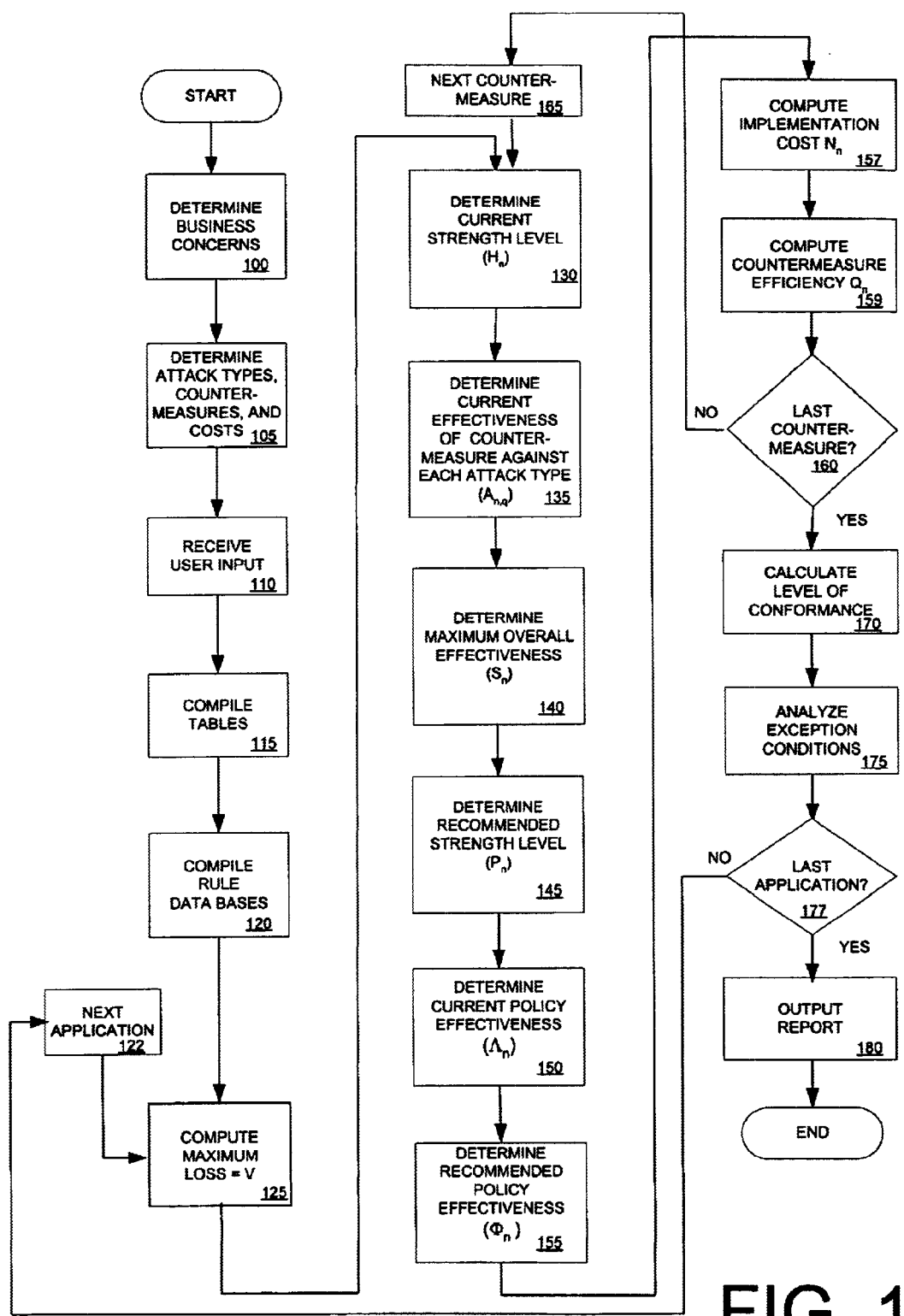
FIG. 1 is a flow diagram representing states of a method consistent with the present invention.

FIG. 1 is a flowchart showing states of a method consistent with the present invention. Some aspects of the following method will vary depending on the nature of the activities of an organization being evaluated. The following example describes an organization whose principle activity is the manufacture and development of computer systems.

Consistent with the present invention, the organization begins by determining the business concerns of the organization (state 100). The set C of business concerns include specific consequences against which an organization would like to protect its application assets including, for example, loss of market share, system outage or unavailability, loss of property, and damage to reputation. The actual types of business concerns may vary depending in part on the activities of the organization being evaluated. Application assets are any software programs and associated information data bases that carry out a useful task including transaction systems, database managers, spreadsheets, communications packages, and document processors. Some other examples of application assets are, for example, the software for managing general ledger data, distribution, and product tracking.

The organization must also determine the types of attacks that the organization may be subject to and corresponding countermeasures that may be implemented to avert those attacks (state 105). The set T of attack types, includes but is not limited to, for example, unauthorized access to and use of confidential business information, unauthorized deletion, destruction or modification of data records, and interruption or denial of service. The set M of countermeasures may include, for example, employing a person (such as an account or security administrator to oversee security measures), implementing a technique (such as password protection, event logging, or authentication), or a installing a device (such as a particular secure network configuration). Attack and countermeasure types may also vary depending on the application being evaluated, the type of business concerns, and the organization's corporate and computing architecture.

Consistent with the present invention, information is gathered that describes the application assets and system architecture of the organization, details about daily operations, and the countermeasures employed at the time of assessment (state 110). In one implementation, this information is obtained by using a questionnaire that is answered by personnel familiar with the organization's operations, although other mechanisms for obtaining the information may be used such as, for example, automated interrogation of computer configurations and networked security services. The questionnaire is tailored to solicit information consistent with the parameters identified above. For example, if corporate training is identified as a countermeasure, then the questionnaire will ask questions such as how often training is performed, what type of training is given, and who delivers the training. One example of a questionnaire consistent with the present invention is shown in FIG. 2.

The identified parameters are used to generate two parameter tables as shown in of FIGS. 3A and 3B (state 115). Table 1 of FIG. 3A, for example, shows identified business concerns in the lefthand column and attack types across the top. Each table entry, $\phi_{i,j}$, represents the probability that business concern, $c_i$, will result from attack $t_j$, determined by independent security councils of security consulting organizations or from existing data from actual business practice.

Table 2 of FIG. 3B is a vulnerability profile showing the set of countermeasures in the left hand column and attack types across the top. Each table entry, $g_{i,j}$, represents the probability that countermeasure, $m_i$, will avert attack type, $t_j$. The probabilities may be determined by independent security councils of security consulting organizations or from existing data from actual business practice.

Consistent with the present invention, one or more rule data bases are constructed for interpreting the information gathered in state 110 (state 120). The rule data bases may be constructed, for example, as rules for use in determining current and recommended countermeasure strength levels. Rule Base A in FIG. 4 is an example of a rule data base consistent with the present invention. Rule Base A reduces the user input on a questionnaire to a numeric value indicating the current countermeasure strength level. In FIG. 4, countermeasures are listed in the lefthand column. The columns marked "Level 1", "Level 2", etc., indicate the various levels of implementation of a countermeasure. Each of the boxes in the body of the table contains logical rules that determine the current level of a countermeasure for a given application as implemented by the organization. For example, in box 401, if the answer to question 1.1 on the questionnaire is 1.1.1(no), "Policy Awareness" is accorded a Level 1. As shown in box 402, if the answer to question 2.1 is 2.1.2(yes) and the answer to question 2.2 is 2.2.3(item c), then countermeasure "Corporate Security Awareness" is accorded "Level 4."

Another example of a rule data base consistent with the present invention is a rule data base for detecting exception conditions, referred to herein as Rule Base B, an example of which is shown in FIG. 5. Rule Base B may include, for example, rules for including or excluding various operating system services, such as authentication modules or I/O devices. Rule Base B may also include rules for identifying conditions that may require increasing existing countermeasure strengths, such as organization size or connections to insecure networks such as the Internet. Organization size may include number of employees, users, computers, and connections. Rule Base B may also contain rules for recognizing that combinations of certain countermeasures are indicated and for adjusting countermeasure effectiveness accordingly. In general, Rule Base B identifies special conditions that may require special actions, such as an engineering review, legal action, or additional physical security.

After these parameters are determined for the business of the organization, each application asset in the overall system is evaluated independently using states 125–177. For each application asset, processing begins with computation of a maximum loss factor, V, for the current application asset (state 125). For each $c_i$ in the set of C business concerns, there exists a corresponding vi representing a monetary value of the loss to the organization if loss of the current application asset results in the business concern $c_i$. The loss estimate includes such factors as cost to restore, recover, or rebuild the lost or damaged application asset or to recover from the side effects caused by compromise of the application asset, such as loss of market share, loss of revenue from crippled manufacturing operations and loss of intellectual property revenue.

To obtain a maximum loss factor, V, the business concern that would result in the greatest loss if this application asset was compromised is identified. The maximum value for this application asset is submitted to the function f, to obtain a maximum loss factor, V. V may be represented mathematically as follows:

$$V = f_1(\max_{i=1\ldots m} v_i)$$

where $v_i$ is the monetary value of the loss of the $i^{th}$ business concern identified for the current application asset and $f_1$ is a conversion function that returns a value factor depending on the maximum loss corresponding to a business concern. For example, $f_1$ may be the following function:

$$f_1(v_i) = \begin{cases} 0.8 & v_i < \$5 \text{ M} \\ 1.0 & \$5 \text{ M} < v_i \leq \$10 \text{ M} \\ 1.2 & \$10 \text{ M} < v_i \leq \$50 \text{ M} \\ 1.5 & \$50 \text{ M} < v_i \leq \$100 \text{ M} \\ 2.0 & v_i > \$100 \text{ M} \end{cases}$$

The outputted numeric factor acts to decrease or increase the required effectiveness level based on the application asset's potential recovery cost, replacement loss, and/or other damage created by the attack. Factors consistent with the present invention, such as the factors in the example above, will likely be developed by a panel of security experts and depend on the organization type.

Next, for each of n countermeasures identified in state 105, the method determines current and recommended strength levels. Current strength level is the level of a countermeasure that the organization was employing at the time of assessment. Current strength level of the $n^{th}$ countermeasure, $H_n$, is determined using Rule Base A compiled in state 120 and described above (state 130). For example, referring again to FIG. 4, for the countermeasure "Policy Awareness" with reference 1.1, there are four possible levels, L1, L2, L4, and L5. As shown in the block under column "L1," if the answer to question 1.1 on the questionnaire is 1.1.1 (no), the countermeasure "Policy Awareness" is accorded a level of "1" (block 401). The value of $H_n$ is therefore 1. In column "L4", for example, if the answer to question 2.1 is 2.1.2(yes) and the answer to question 2.2 is 2.2.3 (b, or the second choice of three), the level of "Policy Awareness" is 4 and $H_n$=4 (block 402).

Next, the method determines the current effectiveness level of countermeasure n in preventing attacks of all types against each of the business concerns identified for this application asset (state 135). $A_{n,e}$ represents the probability that a particular countermeasure, $m_n$, will prevent all types of attack for a specific business concern, $C_e$. For each business concern, $A_{n,e}$ may be computed as follows:

$$A_{n,e} = \sum_{i=1}^{q} \phi_{e,i} g_{n,i} k^2$$

for each of e business concerns. The quantity $g_{n,i}$ is the probability that employing countermeasure $m_n$ will avert attack $t_i$ as shown in Table 1 in FIG. 3A. The quantity $\phi_{e,i}$ is the probability that attack $t_e$ will cause business concern $c_i$ as shown in Table 2 of FIG. 3B. The constant k is a constant designed to establish the numerical range of A.

The maximum effectiveness, $S_n$, of using a particular countermeasure $m_n$ to avert all attack types is determined in state 140. $S_n$ equals the maximum value that results from multiplying each $A_{n,e}$ by the maximum loss factor, V. $S_n$ may be represented mathematically as follows:

$$S_n = \max_{r=1\ldots q} (A_{n,r}V)k$$

$P_n$ is the recommended strength level for the $n^{th}$ countermeasure (state 145). Function $f_2$ is a conversion function that accepts as input, $S_n$, the maximum effectiveness of a particular countermeasure, and returns an ordinal value representing a recommended countermeasure strength level. $P_n$ may be represented mathematically as $P_n = f_2(n, S_n)$. The function $f_2(n, S_n)$ results in an value corresponding with a countermeasure strength level for countermeasure n and differs depending on the number of possible strength levels for the $n^{th}$ countermeasure. For example, if countermeasure 12 has two possible strength levels, $f_2(12, S_n)$ will output a value of 1 or 2. If four strength levels are possible for countermeasure 25, $f_2(25, S_n)$ will output a value of 1, 2, 3, or 4.

The current effectiveness level of the current policy, $\Lambda_n$, for each countermeasure is determined using a third function, $f_3$, that uses current strength level, $H_n$, as input (state 150). Current policy effectiveness may be represented mathematically as follows:

$$\Lambda_n = S_n f_3(n, H_n)$$

In a function $f_3$ consistent with the present invention, $f_3$ returns a ordinal value corresponding to the relative effectiveness of the countermeasure strength level such as in the example below.

$$f_3(n, H_n) = \begin{cases} 20 & 1 < H_n < 20 \\ 40 & 21 < H_n < 40 \\ 60 & 41 < H_n < 60 \\ 80 & 61 < H_n < 80 \\ 100 & H_n \geq 80 \end{cases}$$

The actual values chosen for the ranges in $f_3$ may vary, however, the exemplary ranges used for function $f_3$ as shown above were determined by independent security councils of leading security-consulting organizations. Furthermore, for ease of formulation, each of the countermeasures in the examples was assumed to have a linear distribution. The function $f_3$ for each countermeasure may also be adjusted for nonlinearity of the relative effectiveness of the strength levels of the countermeasures depending on the implementation.

Recommended policy effectiveness, $\Phi_n$, for countermeasure $m_n$ is also determined using the third function, $f_3$, with recommended strength level, $P_n$, as input (state 155). Recommended policy effectiveness, $\Phi_n$, may be represented mathematically as:

$$\Phi_n = S_n f_3(P_n)$$

Next, an implementation cost $N_n$ is computed using recommended strength level, $P_n$ (state 157). Implementation cost $N_n$ is the estimated cost to implement the $n^{th}$ countermeasure at level $P_n$. Countermeasure efficiency $Q_n$ for the $n^{th}$ countermeasure can then be calculated as follows (state 159):

$$Q_n = \frac{\Phi_n}{N_n}$$

where $\Phi_n$ and $N_n$, respectively, are the recommended strength level and implementation cost for the $n^{th}$ countermeasure. Countermeasure efficiency is useful for selecting between countermeasures of approximately the same effectiveness. A higher efficiency will show a greater payback for a given investment.

After states 130 through 160 are completed for each countermeasure in the set, the process continues with state 170. If there are still countermeasures to evaluate, the method continues with state 165 and evaluates the next countermeasure.

Once all the countermeasures have been evaluated, the level of conformance to recommended security policies is calculated (state 170). The level of conformance of the application system at the time of assessment, or application risk, is the difference between current strength level effectiveness and recommended strength level effectiveness of the countermeasures. In an implementation consistent with the present invention, only the positive differences between current and recommended strength levels are considered. By considering only positive differences, the method does not give credit for "overachieving" or, in other words, implementing security procedures that are well above what is considered necessary to be effective. Overachieving can be costly and add unnecessarily to program expenditures.

In the example where only positive differences are considered, the level of conformance is calculated as follows:

$$\Delta = b - \Sigma \max(\Phi_n - \Lambda_n, 0)$$

where $$b = \sum_{\Phi_n \geq a} \Phi_n$$

and $\Lambda_n$ and $\Phi_n$ equal the current effectiveness level and recommended effectiveness level for countermeasure $M_n$, respectively. A high $\Delta$, or conformance value, indicates a secure application system. The conformance value also quantifies the difference between the current security level policy and security policies established by industry best practices and, indirectly, the amount of the applications vulnerability, or risk. A total amount of risk to the organization may be estimated by computing the weighted average of multiple application conformance values, weighted by the proportional value of each application to the organization's total application systems value.

There exist a number of conditions that may need to be addressed in order to fine tune the selection method. These "exception conditions" are special conditions that need to be addressed with special rules such as those found in Rule Base B determined in state 120 (state 175). FIG. 5 is an example of additional rules consistent with the present invention that may constitute Rule Base B. For example, if any of the processors in the application system serve multiple functions, such as serving both as a file transfer server and a gateway, some of the countermeasures and recommended countermeasures may need to be adjusted. Additionally, some countermeasure strengths may need to be adjusted if the size of the user population exceeds a designated threshold. Organizations with user populations over a threshold, for example, may want to initiate more formal account management procedures such as periodic mandatory password changes, formal procedures for terminated or inactive accounts, or central password administration.

Another example of an exception condition possibly warranting special attention is number and value of transactions processed by the application. If, for example, the application is used to access bank account data or make large payments, the organization may want to employ added security protections such as formalized configuration management, compartmentalizing data, special audit procedures, or requiring a minimum of two people acknowledge changes to the application code. Applications that are operated on network devices that are physically located in multiple geographic locations may also require special attention. Exception conditions may also take into consideration exceptional costs of implementation, such as licensing, training, installation and development costs.

If there are still application assets to evaluate, the process continues with the next application (state 122). If the last application asset has been evaluated, the method outputs a written report (state 180). In addition to other management information, the reports may contain specifications of both the current and recommended level of countermeasure implementation. For example, FIG. 6 contains an example of written security policies for implementation of each countermeasure. For example, if the $n^{th}$ countermeasure is "2.1 Requirements for Corporate Security Awareness Training" as shown in FIG. 6, and the recommended strength level for the $n^{th}$ countermeasure is $P_n=3$, then the method may print out an information security policy like "Training requirement identified, but not formal" and accompanying text as shown for level L3 in FIG. 6.

B. Architecture

Figure 7:
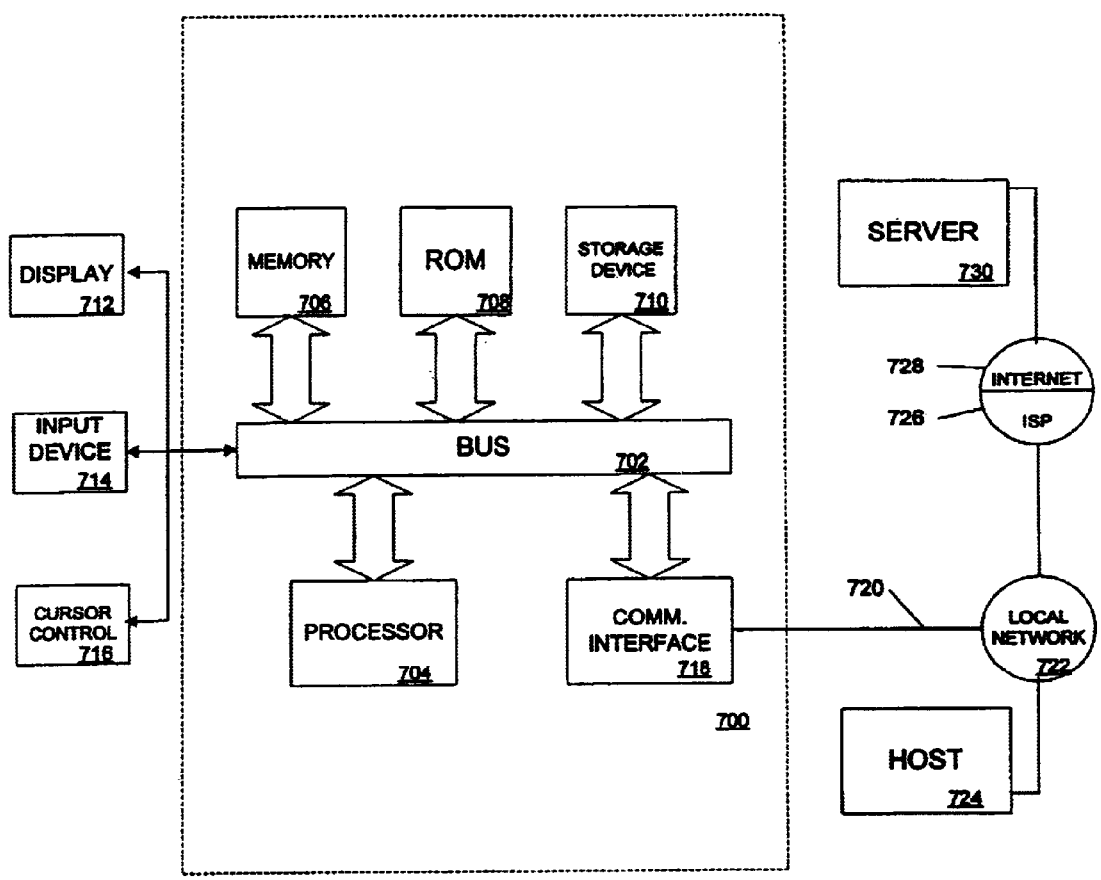
FIG. 7 shows a block diagram of a system consistent with the present invention.

FIG. 7 is a block diagram that illustrates a computer system 700 upon which embodiments of the invention may be implemented. Computer system 700 includes a bus 702 or other communication mechanism for communicating information, and a processor 704 coupled with bus 702 for processing information. Computer system 700 also includes a memory 706, which can be a random access memory (RAM) or other dynamic storage device, coupled to bus 702 for storing information, such as the parameter tables, rule data bases, and questionnaire, and instructions to be executed by processor 704. Memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT) or liquid crystal display (LCD), for displaying information to a computer user. An input device 714, including alphanumeric and other keys, is coupled to bus 702 for communicating information and command selections to processor 704. Another type of user input device is cursor control 716, such as a mouse, a trackball or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

An embodiment of the present invention uses a computer system 700 for selecting a security model. Consistent with one implementation of the invention, information from the multiple remote resources is provided by computer system 700 in response to processor 704 executing one or more sequences of one or more instructions contained in memory 706. Such instructions may be read into memory 706 from another computer-readable medium, such as storage device 710. Execution of the sequences of instructions contained in memory 706 causes processor 704 to perform the process states described herein. In an alternative implementation, hard-wired circuitry may be used in place of or in combination with software instructions to implement the invention. Thus implementations of the invention are not limited to any specific combination of hardware circuitry and software.

The term "computer-readable medium" as used herein refers to any media that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as memory 706. Transmission media includes coaxial cables, copper wire, and fiber optics, including the wires that comprise bus 702. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punch cards, papertape, any other physical medium with patterns of holes, a RAM, PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector coupled to bus 702 can receive the data carried in the infra-red signal and place the data on bus 702. Bus 702 carries the data to memory 706, from which processor 704 retrieves and executes the instructions. The instructions received by memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to local network 722. For example, communication interface 718 may be an integrated services digital network (ISDN) card, a cable modem, or a modem to provide a data communication connection to a corresponding type of telephone line. As another example, communication interface 718 may be a local area network (LAN) card provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 and/or to data equipment operated by an Internet Service Provider (ISP) 726. ISP 726 in turn provides data communication services through the Internet 728. Local network 722 and Internet 728 both use electric, electromagnetic, or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718. In accordance with the present invention, one such downloaded application allows a user to select security countermeasures and countermeasure strength levels, as described herein. The received code may be executed by processor 704 as it is received, and/or stored in storage device 710, or other non-volatile storage for later execution. In this manner, computer system 700 may obtain application code in the form of a carrier wave.

Although computer system 700 is shown in FIG. 7 as being connectable to one server, 730, those skilled in the art will recognize that computer system 700 may establish connections to multiple servers on Internet 728. Additionally, it is possible to implement methods consistent with the principles of the present invention on other device comprising at least a processor, memory, and a display, such as a personal digital assistant.

C. CONCLUSION

As described in detail above, methods and apparatus consistent with the present invention select a security model based on input data and rules corresponding to the application. The foregoing description of an implementation of the invention has been presented for purposes of illustration and description. For example, the described implementation includes software but the present invention may be implemented as a combination of hardware and software or in hardware alone. The scope of the invention is therefore defined by the claims and their equivalents.

What is claimed is:

1. An apparatus for outputting data identifying a security model including at least one countermeasure and a recommended strength level for said at least one countermeasure, said apparatus comprising:

input means operable to enable user input of data indicative of one or more risks associated with a set of attacks and input of data indicative of current strength levels of countermeasures included in a current security model;

a rule database operable to store data relating strength levels of countermeasures to the effectiveness of said countermeasures against said one or more risks associated with a set of attacks;

processing means for processing data received from said input means utilizing data stored in said rule database and data entered utilizing said input means to select a suggested security model including at least one countermeasure and its recommended strength level; and output means for outputting data identifying said security model selected by said processing means.

2. The apparatus of claim 1, wherein said input means is operable to enable user input of data indicative of one or more business concerns and said rule database comprises:

first association means operable to associate strength levels of each of a number of countermeasures with data probability data indicative of different types of attacks being averted by a said countermeasure at said strength level; and second association means operable to associate each of said one or more business concerns with data indicative of each said concern arising from different type of attacks.

3. The apparatus of claim 2, wherein said input means is further operable to enable user input of data identifying one or more assets and loss data indicative of monetary losses to each said one or more assets resulting from each of said business concerns, wherein said processing means is operable to determine for each of said one or more assets the maximum loss related to a business concern and to utilize said determined maximum losses to select suggested security model.

4. An apparatus in accordance with any preceding claim 1, wherein said rule database is further operable to store data relating each of said strength levels of said countermeasures to cost data indicative of the cost of implementing said countermeasures.

5. An apparatus in accordance with claim 1, wherein said processing means is operable to determine the implementation cost for implementing security models, wherein said processing means is operable to select said suggested security model based upon the cost of implementing countermeasures at strength levels greater than said current strength levels.

6. An apparatus in accordance with claim 5, wherein said processing means is further operable to modify the selected security model based on at least one exception condition.

7. An apparatus in accordance with claim 6, wherein said processing means is operable to modify the selected security model based on user input data indicative of at least one or a combination of:

(a) the organization's size;

(b) number of transactions processed by the application;

(c) monetary value of transactions processed by the application;

(d) number of data transfer interfaces between the application and other applications;

(e) configuration of the computer network; and (f) number of processors in the computer network.

8. An apparatus in accordance with claim 1, wherein said processing means is further operable to modify the selection of a suggested security model based on user input of data indicative of an application being identified as sharing data with another application.

9. An apparatus in accordance with claim 1, wherein said processing means is further operable to modify the selection of a security model based on user input of data indicative of an application has identified as operating on a computer network located in more than one geographic location.

10. An apparatus in accordance with claim 1, wherein said processing means is further operable to:

determine recommended policy effectiveness for the at least one countermeasure based upon the recommended strength level and a maximum effectiveness level;

determine current policy effectiveness level based on a current strength level and the maximum effectiveness level; and determine a level of conformance based upon the current policy effectiveness and the recommended policy effectiveness.

11. An apparatus in accordance with claim 10, wherein said determination of a level of conformance comprises determining a risk that an attack to the application will result in at least one business concern.

12. An apparatus in accordance with claim 1, wherein said processing means is further operable to determine an implementation cost for the at least one countermeasure; and determine the countermeasure efficiency based on a maximum effectiveness level and the recommended strength level for the at least one countermeasure.

13. An apparatus in accordance with claim 1, wherein said processing means is further operable to select said suggested security model based on said countermeasure efficiency determined for said model.

14. An apparatus in accordance with claim 1, 2, or 3, wherein said input means further comprises a user interface enabling a user to enter responses to a set of questions relating to security procedures at an organization; and means for determining data indicative of current strength levels of countermeasures based upon the responses entered using said user interface.

15. A recording medium having stored thereon computer implementable program instructions for causing a programmable computer to become configured as an apparatus for outputting data identifying a security model in accordance with any of claims 1–3 and 5–13.

\* \* \* \* \*

UNITED STATES PATENT AND TRADEMARK OFFICE
CERTIFICATE OF CORRECTION

PATENT NO. : 6,631,473 B2
DATED : October 7, 2003
INVENTOR(S) : Timothy J. Townsend It is certified that error appears in the above-identified patent and that said Letters Patent is hereby corrected as shown below:

Column 11,
Lines 8-9, "with any preceding claim 1, wherein" should read -- with any preceding claim, wherein --; and Column 12,
Line 29, "claim 1, 2, or 3," should read -- claims 1, 2, or 3 --.

Signed and Sealed this

Thirteenth Day of April, 2004

JON W. DUDAS
*Acting Director of the United States Patent and Trademark Office*